United States Patent
Matsui et al.

(10) Patent No.: US 8,830,610 B2
(45) Date of Patent: Sep. 9, 2014

(54) EXPOSURE METHOD FOR COLOR FILTER SUBSTRATE

(75) Inventors: Kohei Matsui, Tokyo (JP); Ryosuke Yasui, Tokyo (JP); Keiichi Tanaka, Osaka (JP); Takenori Yoshizawa, Osaka (JP)

(73) Assignees: Toppan Printing Co., Ltd., Tokyo (JP); Sharp Kabushiki Kaisha, Osaka (JP)

( * ) Notice: Subject to any disclaimer, the term of this patent is extended or adjusted under 35 U.S.C. 154(b) by 184 days.

(21) Appl. No.: 13/522,626

(22) PCT Filed: Jan. 11, 2011

(86) PCT No.: PCT/JP2011/000076
§ 371 (c)(1),
(2), (4) Date: Jul. 17, 2012

(87) PCT Pub. No.: WO2011/086892
PCT Pub. Date: Jul. 21, 2011

(65) Prior Publication Data
US 2012/0300323 A1 Nov. 29, 2012

(30) Foreign Application Priority Data
Jan. 18, 2010 (JP) ................................ 2010-008512

(51) Int. Cl.
*G02B 5/22* (2006.01)
*G02B 5/20* (2006.01)
*G02F 1/1339* (2006.01)
*G02F 1/1335* (2006.01)

(52) U.S. Cl.
CPC ............ *G02B 5/201* (2013.01); *G02F 1/13394* (2013.01); *G02F 1/133516* (2013.01)
USPC .......................................... 359/885; 359/891

(58) Field of Classification Search
None
See application file for complete search history.

(56) References Cited

U.S. PATENT DOCUMENTS 5,757,452 A * 5/1998 Masaki et al. ................ 349/110

FOREIGN PATENT DOCUMENTS

| CN | 101609227 A | 12/2009 |
|---|---|---|
| JP | 2001-249462 | 9/2001 |
| JP | 2006-292955 | 10/2006 |
| JP | 2007-121344 | 5/2007 |
| JP | 2007-240711 | 9/2007 |
| JP | 2007-281317 | 10/2007 |

(Continued)

OTHER PUBLICATIONS

International Search Report of Corresponding PCT Application PCT/JP2011/000076 mailed Mar. 8, 2011.
Japanese Office Action mailed Dec. 19, 2013 in corresponding Japanese Application No. 2010-008512.
Machine Translation of JP 2009-116068.

(Continued)

*Primary Examiner* — Jade R Chwasz

(57) ABSTRACT

An exposure method is provided. In (a) of FIG. 8, exposure is performed while a substrate 20 is being transported in the Y direction, to simultaneously form first layers 81 and layers 91 in first non-display regions 51 and the display region, respectively, on the substrate 20. Next, in (b) of FIG. 8, the substrate 20 is rotated by 90 degrees, and exposure is performed while the substrate 20 is being transported in the X direction, to form second layers 82 in second non-display regions 52. Subsequently, in (c) of FIG. 8, proximity exposure is performed once on the substrate 20 to simultaneously form third layers 83 on the first layers 81 in the first non-display regions 51, fourth layers 84 on the second layers 82 in the second non-display regions 52, and layers 92 in the display region 40.

6 Claims, 15 Drawing Sheets

(56) References Cited

FOREIGN PATENT DOCUMENTS

| | | |
|---|---|---|
| JP | 2008-158138 | 7/2008 |
| JP | 2009-116068 | 5/2009 |
| WO | WO 00/11707 | 3/2000 |
| WO | WO 2010/125823 | 11/2010 |

OTHER PUBLICATIONS

Chinese Office Action issued Mar. 27, 2014, in corresponding Chinese Patent Application No. 201180006343.3.

"Color Filter Layer and Method of Manufacturing Same", Machine Translation of Japanese Patent Application Publication No. 2001-249462, filed Sep. 14, 2001.

* cited by examiner

EXPOSURE METHOD FOR COLOR FILTER SUBSTRATE

CROSS-REFERENCE TO RELATED APPLICATIONS

This application is a U.S. National Phase application of PCT/JP2011/000076 filed Jan. 11, 2011 and claims the priority benefit of Japanese Application No. 2010-008512 filed Jan. 18, 2010 in the Japanese Intellectual Property Office, the contents of both of which are incorporated herein by reference.

TECHNICAL FIELD

The present invention relates to an exposure method for a color filter substrate used for liquid crystal display devices and the like.

BACKGROUND ART

With recent increase in the size of liquid crystal display devices, the size of color filters used for liquid crystal display devices has also increased. In a process of producing color filters, patterning is performed by photolithography to form colored layers. However, there is a problem that the cost of producing color filters is increased due to the very high price of large photomasks. In response, various kinds of new exposure methods using small masks have been studied.

One example of the exposure methods using small masks is a method (hereinafter, referred to as a "small mask continuous exposure mode") in which the entire surface of a to-be-exposed substrate is repeatedly exposed while the substrate is being transported, by using an exposure device in which photomasks smaller than the substrate are mounted to exposure heads.

FIG. 15 is a plan view illustrating an exposure method employing the small mask continuous exposure mode, and FIG. 16 is a side view illustrating a positional relationship among a substrate, a photomask, and a blind shutter.

As shown in FIG. 15, a photomask 130 is located relative to a substrate 120. The photomask includes, for example, a plurality of openings 131 for forming dot-shaped colored pixels and photo spacers (hereinafter, also referred to as "PSs"). While the substrate 120 is being transported in a direction indicated by an arrow in FIG. 15, display regions of the substrate 120 are sequentially exposed through the openings 131 to form colored pixels and photo spacers (not shown).

The substrate 120 has display regions 140 in which colored pixels are formed and non-display regions 150 surrounding the circumferences of the display regions 140. The PSs formed in each display region 140 function to maintain a constant interval between a color filter substrate 110 and a TFT substrate which is an opposite substrate when the two substrates are bonded together. The PSs are provided also in each non-display region 150 in some cases (PSs provided in each non-display region 150 are referred to as "dummy PSs" hereinafter). When the color filter substrate 110 and the TFT substrate are bonded together, the dummy PSs serve an important function of maintaining a constant interval between the two substrates at the outside of the display region 140, and thus stabilizing a cell gap (a space containing liquid crystals in a cell).

CITATION LIST

Patent Literature

[Patent Literature 1] Japanese Laid-Open Patent Publication No. 2006-292955

SUMMARY

In general, not all parts in a color filter substrate are provided with PSs (including dummy PSs), and some parts have a region in which no dummy PS is formed, so as to avoid contact with TFT lines and not to obstruct cutting out of the substrate. The region in which no dummy PS is formed acts as a factor of deflection of the color filter substrate when the substrate is bonded to a TFT substrate. At the time of bonding, different stresses are applied to a display region and its surrounding region. Therefore, the arrangement density, the size, and the height of dummy PSs are adjusted separately from those of PSs provided in the display region in accordance with the distribution of stress occurring when the color filter substrate and the TFT substrate are bonded together. In addition, the dummy PSs are arranged in a non-display region with irregular pitches in order to avoid interference with an alignment mark or the like which is necessary for the production process of the color filter substrate.

In the small mask continuous exposure mode described above, however, since the same patterns are repeatedly burned along the substrate transportation direction, the shape of the patterns and the arrangement pitch of the patterns cannot be changed during the exposure. Furthermore, as shown in FIG. 15, a plurality of color filter substrates 110 are formed on a single substrate 120 by exposure, and at this time, portions sandwiched between the display regions 140 aligned in the substrate transportation direction are not exposed through the same photomasks as used for exposure of the display regions 140. Accordingly, as shown in FIG. 16, blind shutters 139 that move in synchronization with the substrate are provided to shade regions between the display regions 140. This causes a problem that dummy PSs cannot be formed by exposure in portions of the non-display regions 150 that are along the sides orthogonal to the substrate transportation direction.

Therefore, an object of the present invention is to provide an exposure method that can efficiently form dummy PSs in a non-display region outside a display region on a color filter substrate by using the small mask continuous exposure mode.

The present invention relates to an exposure method for a color filter substrate. The color filter substrate includes: a rectangular display region which has a pair of sides extending in a first direction and a pair of sides extending in a second direction orthogonal to the first direction; a pair of first non-display regions which are respectively along the sides extending in the first direction; and a pair of second non-display regions which are respectively along the sides extending in the second direction. A plurality of colored pixels and a plurality of PSs are provided in the display region. A plurality of dummy PSs are provided in the first and second non-display regions. In order to form the color filter substrate, the exposure method includes the steps of: forming, in the first non-display region, a first layer included in a first dummy PS and composed of the same material as a colored layer included in a colored pixel of a first color, by intermittently performing exposure a plurality of times on a substrate to which a photoresist of the first color has been applied while transporting the substrate in the first direction; and forming, in the second non-display region, a second layer included in a second dummy PS and composed of the same material as a colored layer included in a colored pixel of a second color, by intermittently performing exposure a plurality of times on the substrate to which a photoresist of the second color has been applied while transporting the substrate in the second direction. The step of forming the first layer and the step of forming the second layer are carried out in an arbitrary order.

According to the present invention, dummy PSs can be formed in the entire non-display region located outside the four sides of a display region of a color filter substrate by performing exposure using the small mask continuous exposure mode.

DESCRIPTION OF EMBODIMENTS (Basic Structure)

Figure 1:
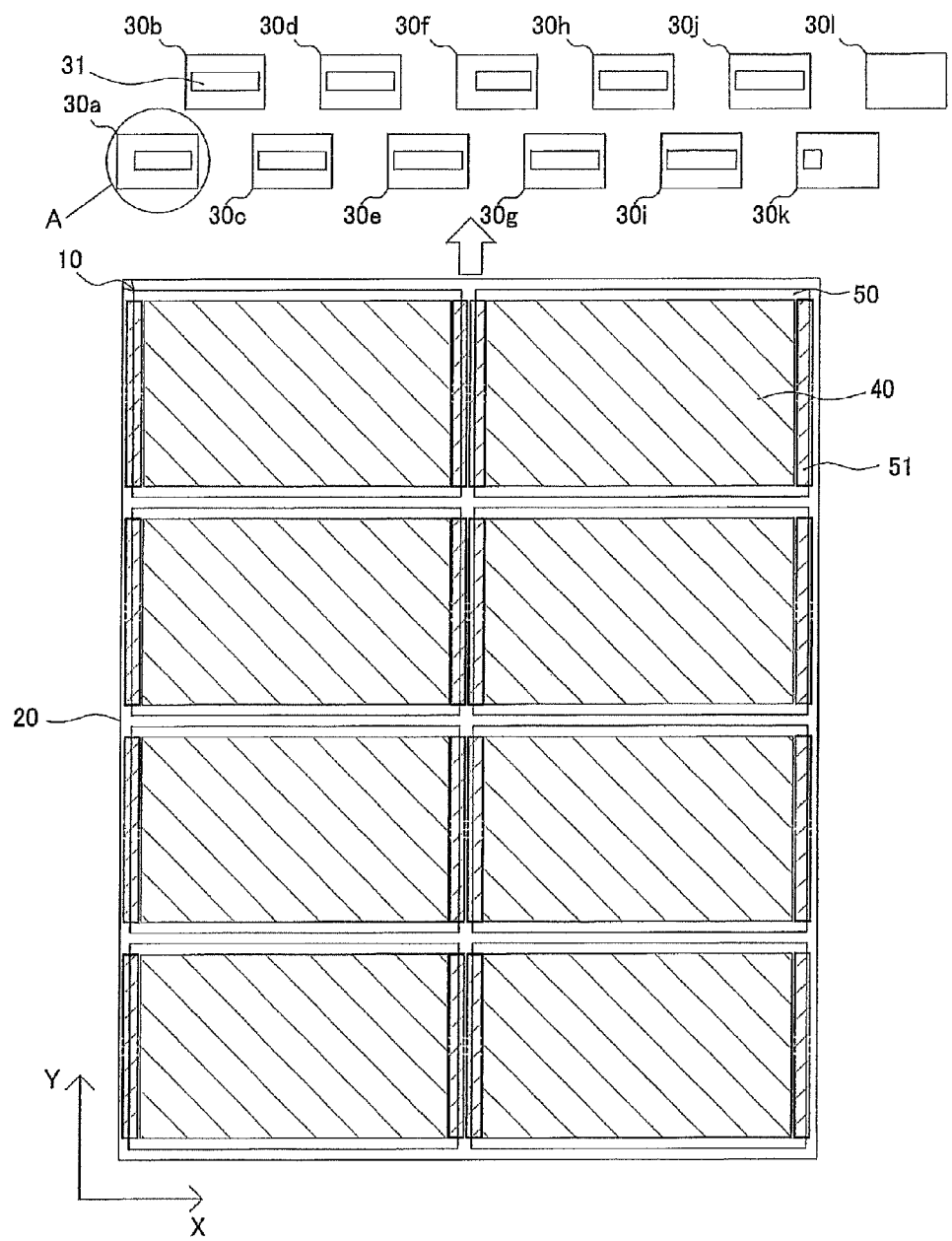
FIG. 1 is a plan view illustrating a basic exposure method common to all embodiments of the present invention.
Figure 2:
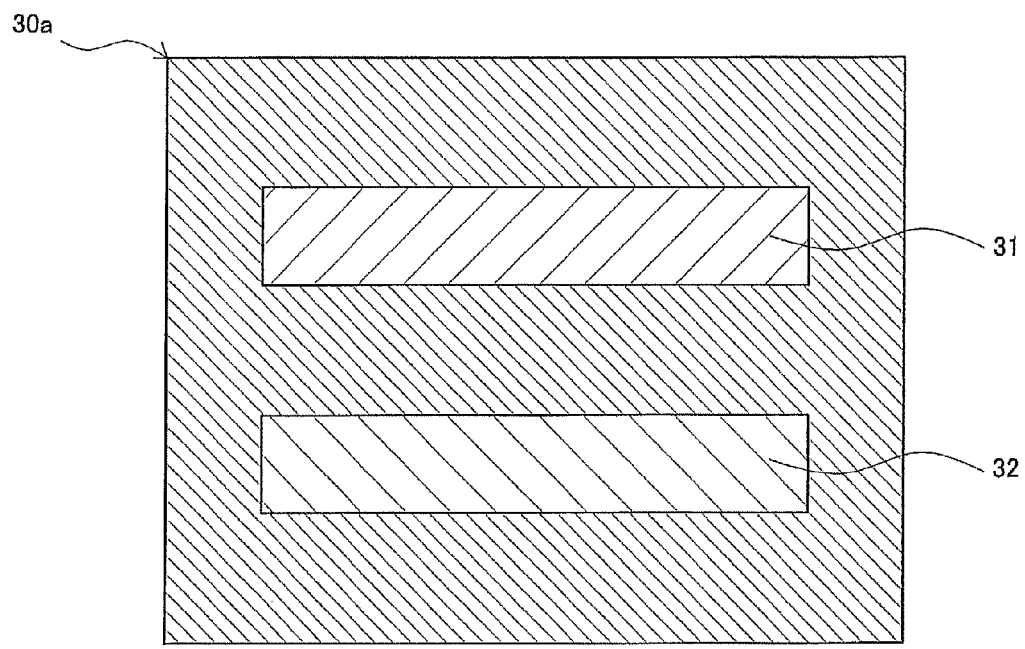
FIG. 2 is a plan view illustrating an example of the arrangement of openings of photomasks which is common to all embodiments of the present invention.

FIG. 1 is a plan view illustrating a basic exposure method common to all embodiments of the present invention. FIG. 2 is a plan view illustrating a basic arrangement of openings of photomasks which is common to all embodiments of the present invention, and is an enlarged view of an A portion of FIG. 1. In FIG. 1, regions indicated by hatching sloping downward to the right are display regions in which colored pixels are arranged, and regions indicated by hatching sloping upward to the right are first non-display regions described later. In the drawings mentioned hereinafter, the direction of a substrate is defined based on an X direction and a Y direction orthogonal to each other for convenience of explanation. Specifically, the X direction is parallel to the oppositely-located long sides of the display regions, and the Y direction is parallel to the oppositely-located short sides of the display regions (the same applies to the drawings mentioned hereinafter).

As shown in FIG. 1, photomasks 30a to 30l are mounted to a plurality of exposure heads, respectively, and are arranged in the X direction in two separate rows. More particularly, the photomasks 30a, 30c, 30e, 30g, 30i, and 30k are arranged at predetermined intervals in the first row (on the side from which a substrate 20 is brought in), and the photomasks 30b, 30d, 30f, 30h, 30j, and 30l are arranged in the second row so as to compensate for the spaces between the photomasks in the first row.

The photomasks 30a to 30l include openings for forming a plurality of colored pixels and a plurality of PSs in display regions 40. In addition, openings for forming a plurality of dummy PSs in first non-display regions 51 described later are provided on the left end of the photomask 30a, on the right end of the photomask 30e, on the left end of the photomask 30f, and in the photomask 30k.

Here, as shown in FIG. 2, arrays of openings 31 and 32 are formed in two separate regions in the photomask 30a (the same is true for the other photomasks 30b to 30l, although not shown). This is in order to enable one photomask to form two types of patterns. The openings are used as follows: the openings 31 are used for exposure when the substrate 20 is transported in the Y direction; and the openings 32 are used for exposure when the substrate 20 is transported in the X direction described later. When the substrate transportation direction is changed between the X and Y directions, the arrays of openings to be used are switched by shifting the photomasks upward or downward such that the array of openings 31 or the array of openings 32 is selectively opposed to a light source.

In the example shown in FIG. 1, eight color filter substrates 10 are formed on the substrate 20. At the time of exposure, as shown in FIG. 1, the Y direction and the transportation direction of the substrate 20 are aligned with each other, and exposure is intermittently carried out a plurality of times while the substrate 20 is being transported at a predetermined speed toward the photomasks 30a to 30l arranged as shown in FIG. 1. Thus, patterning is performed to sequentially form colored pixels and PSs in each display region 40 on the substrate 20, and sequentially form dummy PSs in each pair of regions (hereinafter, referred to as "first non-display regions") 51 that are along the sides of the display region 40 in the Y direction. In this process, regions between the display regions 40 adjacent in the substrate transportation direction are shaded by using blind shutters.

Figure 3:
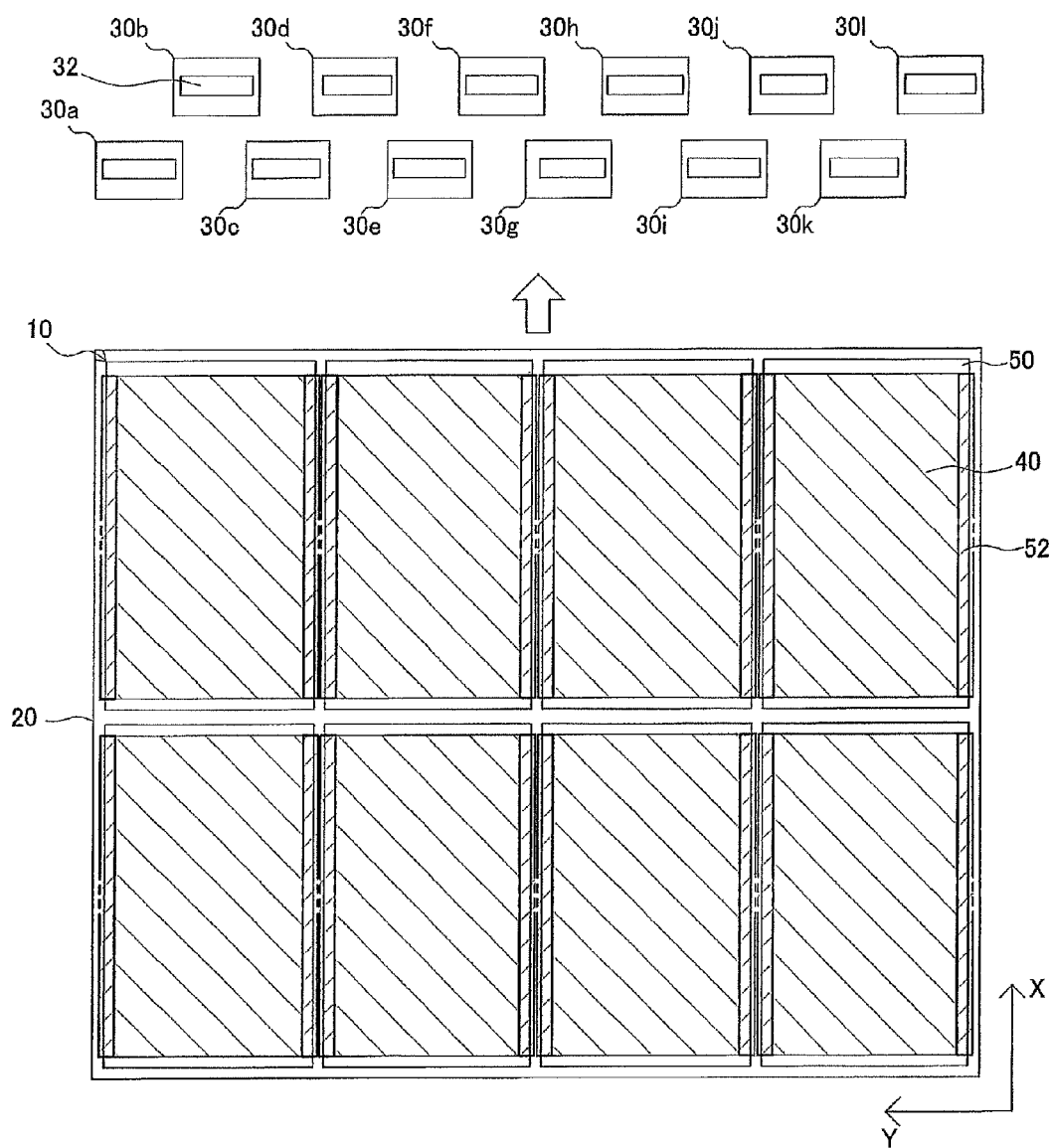
FIG. 3 is a plan view illustrating a basic exposure method common to all embodiments of the present invention.

FIG. 3 is a plan view illustrating a basic exposure method common to all embodiments of the present invention, and illustrates an exposure method performed in combination with the exposure method shown in FIG. 1. In FIG. 3, regions indicated by hatching sloping downward to the right are the display regions, and regions indicated by hatching sloping upward to the right are second non-display regions described later.

After scanning exposure in the Y direction is completed, the substrate 20 whose first non-display regions 51 have been exposed is rotated by 90 degrees from the state shown in FIG. 1, and is thereby positioned as shown in FIG. 3 relative to the photomasks 30a to 30l (the transportation direction of the substrate and the X direction of the substrate are aligned with each other). At the time of the exposure shown in FIG. 3, patterns to be formed by exposure need to be changed in accordance with the orientation of the substrate 20, and for this purpose, the other array of openings 32 (see FIG. 2) provided in each of the photomasks 30a to 30l can be used instead of replacing the photomasks themselves. In addition, the photomasks 30a to 30l include openings for forming a plurality of colored pixels and a plurality of PSs in the display regions 40. Furthermore, openings for forming a plurality of dummy PSs in second non-display regions 52 are provided on the left end of the photomask 30a, the right end of the photomask 30c, the left end of the photomask 30d, the right end of the photomask 30f, the left end of the photomask 30g, the right end of the photomask 30i, the left end of the photomask 30j, and the right end of the photomask 30l.

The X direction and the transportation direction of the substrate 20 are aligned with each other, and exposure is intermittently carried out a plurality of times while the substrate 20 is being transported at a predetermined speed. Thus, patterning is performed to sequentially form colored pixels and PSs in each display region 40 on the substrate 20, and sequentially form dummy PSs in each pair of regions (hereinafter, referred to as "second non-display regions") 52 that are along the sides of the display region 40 in the X direction. In this process, regions between the display regions 40 adjacent in the substrate transportation direction are shaded by using blind shutters.

Colored pixels of the same color and layers of the same color which constitute the PSs in the display regions 40 may be formed by performing scanning exposure once in the X direction or the Y direction, or may be formed by performing scanning exposure two times in the X and Y directions.

Figure 4:
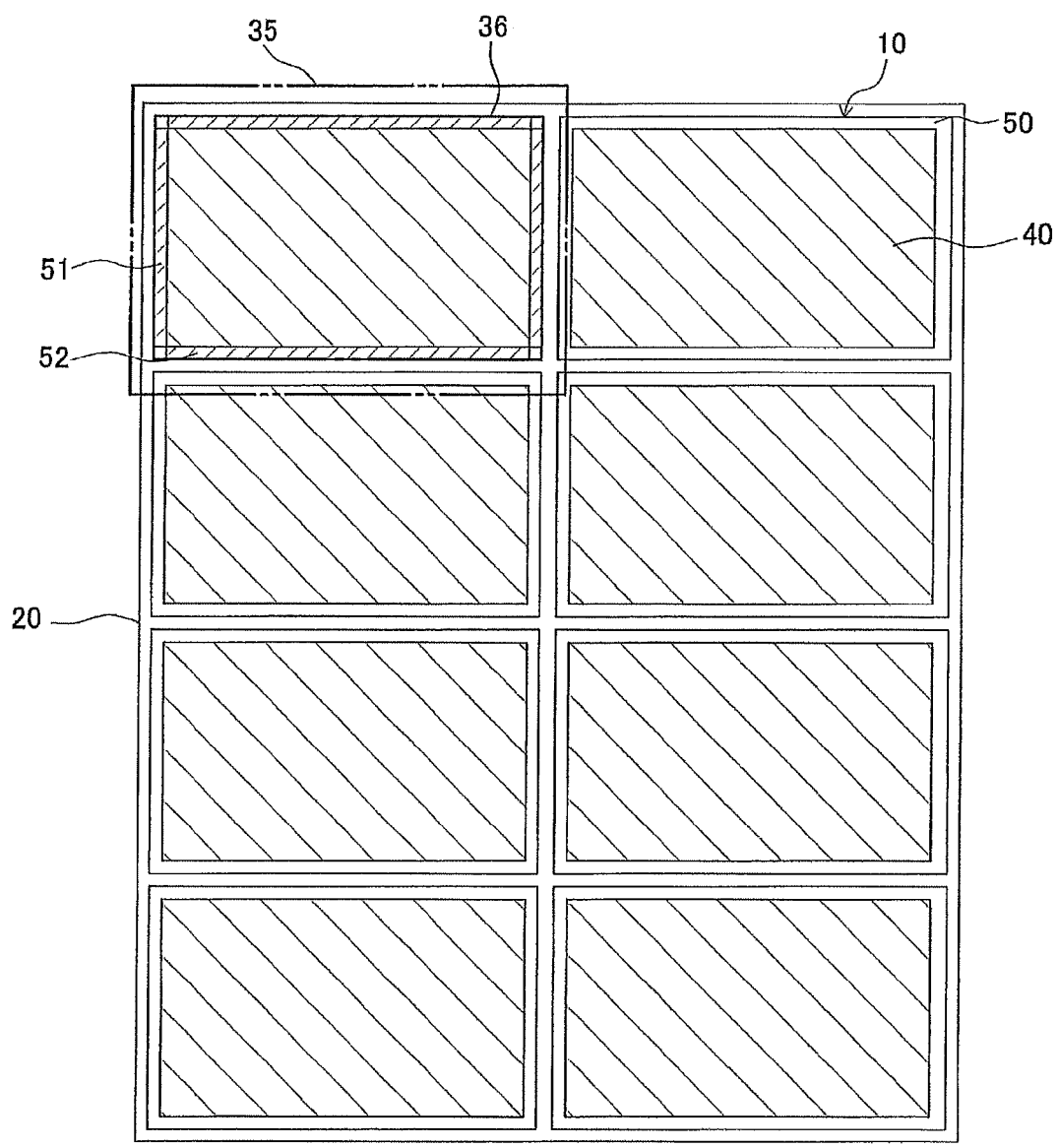
FIG. 4 is a plan view illustrating a basic exposure method common to all embodiments of the present invention.

FIG. 4 is a plan view illustrating a basic exposure method common to first and third embodiments of the present invention, and illustrates an exposure method performed in combination with the exposure methods shown in FIGS. 1 and 3. In FIG. 4, regions indicated by hatching sloping downward to the right are the display regions, and regions indicated by hatching sloping upward to the right are the first and second non-display regions. In addition, an outer frame indicated by an alternate long and two short dashes line represents the outer shape of a photomask, and the inside of an inner frame indicated by alternate long and two short dashes line represents a region in which an array of openings are formed.

After scanning exposure in the X and Y directions is completed, a photomask 35 that allows the entire region of each color filter substrate 10 to be exposed at one time is disposed relative to the substrate 20 whose first non-display regions 51 and second non-display regions have been exposed. Thus, an array of openings 36 is formed such that the display region 40 and a non-display region 50 (including the first non-display regions 51 and the second non-display regions 52) can be exposed at one time.

In a state where the photomask 35 is disposed as described above, the region of the color filter substrate 10 located in the first row and the left column on the substrate 20 is exposed by using a proximity mode (hereinafter, the exposure using this mode is referred to as "proximity exposure"). Patterning is performed on the substrate 20 by this exposure to simultaneously form colored pixels and PSs in the display region 40, dummy PSs in the first non-display regions 51, and dummy PSs in the second non-display regions 52. After the exposure, the photomask 35 is moved and opposed to the region of the next color filter substrate 10 (e.g., the color filter substrate located in the second row from the top and the left column), and the same exposure is carried out. This process is repeated to expose all the regions (4 rows×2 columns) of the color filter substrates 10 on the substrate 20.

Figure 5:
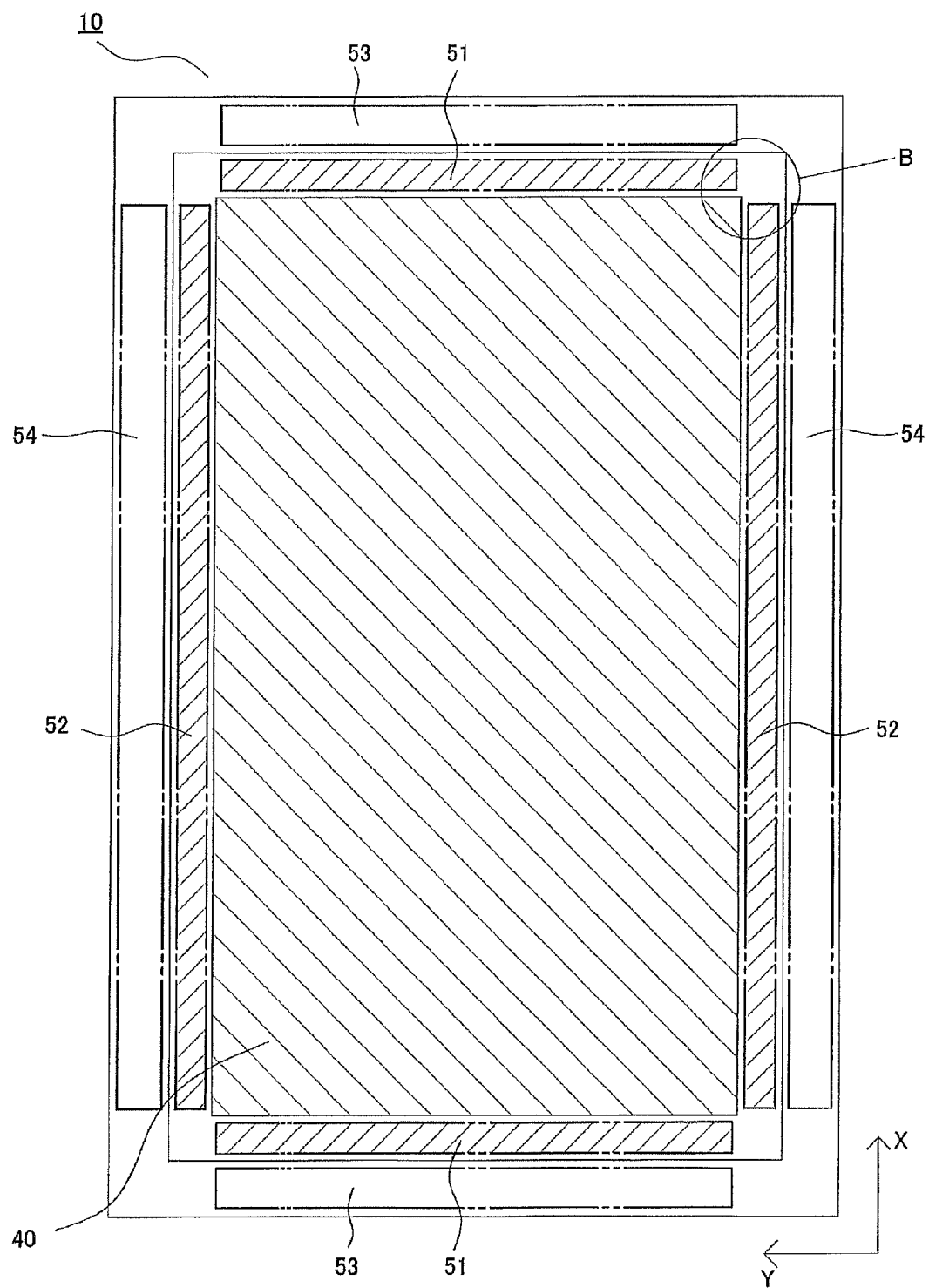
FIG. 5 is a plan view of a color filter common to all embodiments of the present invention.
Figure 6:
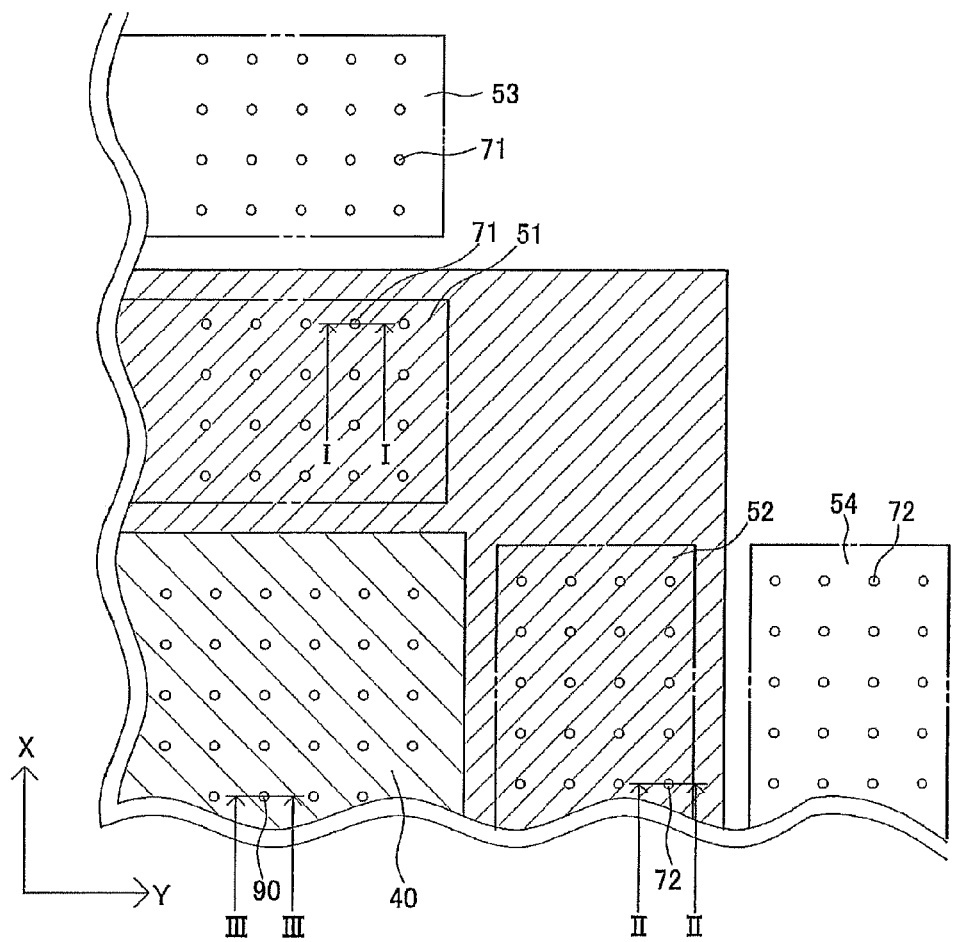
FIG. 6 is an enlarged view of a B portion shown in FIG. 5.

FIG. 5 is a plan view of a color filter substrate formed after the exposure, and FIG. 6 is an enlarged view of a B portion of FIG. 5.

The color filter substrate 10 formed after the small mask continuous exposure is performed in the X and Y directions or after the small mask continuous exposure is performed in the X and Y directions and the proximity exposure is performed, has colored pixels (not shown) and PSs 90 in the display region 40, and has a plurality of dummy PSs 71 in the first non-display regions 51 and a plurality of dummy PSs 72 in the second non-display regions 52. Furthermore, as shown in FIGS. 5 and 6, the dummy PSs 71 and 72 may be formed in peripheral dummy PS formation regions 53 and 54 located outside the first non-display regions 51 and the second non-display regions 52 at the same time as the dummy PSs 71 and 72 are formed in the first non-display regions 51 and the second non-display regions 52. The dummy PSs in the peripheral dummy PS formation regions 53 and 54 and the dummy PSs in the first and second non-display regions 51 and 52 have the same structure. The only difference lies in whether the dummy PSs are formed on the substrate or on a black matrix.

Hereinafter, exposure methods according to embodiments will be described with reference to FIGS. 7 to 14 and FIG. 6.

First Embodiment

Figure 7:
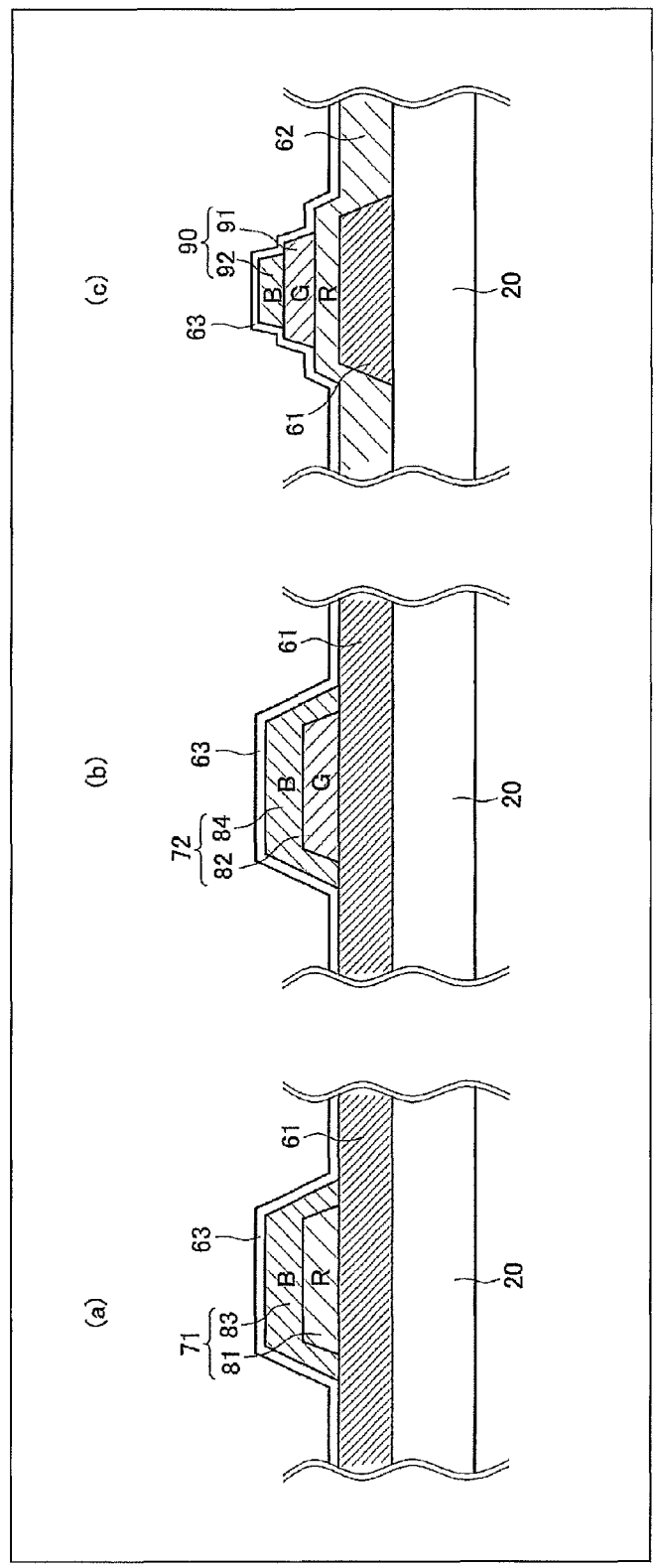
FIG. 7 shows cross-sectional views of a PS and dummy PSs on a color filter substrate according to a first embodiment.

FIG. 7 shows cross-sectional views of portions of a color filter substrate according to a first embodiment. More particularly, (a) corresponds to a cross-sectional view taken along the I-I line of FIG. 6, (b) corresponds to a cross-sectional view taken along the II-II line of FIG. 6, and (c) corresponds to a cross-sectional view taken along the line of FIG. 6.

As shown in FIG. 7(a), a first layer 81 and a third layer 83 constituting a dummy PS 71 are formed in the first non-display region 51 on the substrate 20 on the surface of which a black matrix 61 is formed. As shown in (b), a second layer 82 and a fourth layer 84 constituting a dummy PS 72 are formed in the second non-display region 52 on the substrate 20 on the surface of which the black matrix 61 is formed. As shown in (c), the black matrix 61 and a colored layer 62 are stacked in the display region 40 on the substrate 20. In addition, layers 91 and 92 constituting a PS 90 are stacked on the colored layer 62 over the black matrix 61. Furthermore, an ITO film 63 is formed so as to cover all of the display region 40, the first non-display region 51, and the second non-display region 52 which are shown in (a) to (c). In the present embodiment, the first layer 81 is composed of the same material as the red colored layer 62, the second layer 82 and the layer 91 are composed of the same material as a green colored layer, and the third layer 83, the fourth layer 84, and the layer 92 are composed of the same material as a blue colored layer.

Figure 8:
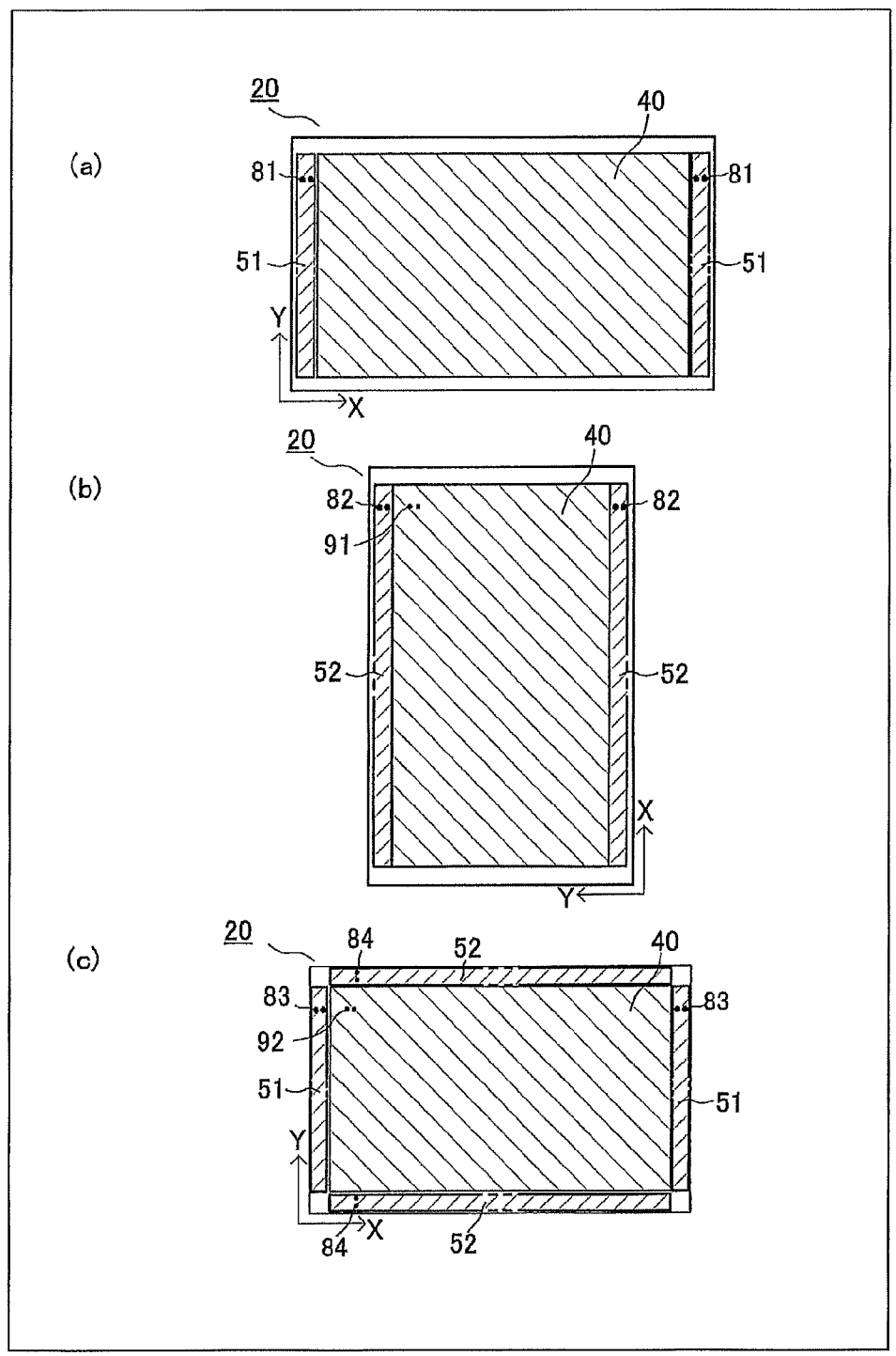
FIG. 8 shows plan views illustrating an exposure method for the color filter substrate according to the first embodiment.

FIG. 8 shows plan views illustrating an exposure method for the color filter substrate according to the first embodiment. Of the entire substrate, only a region that corresponds to a single color filter substrate is shown in order to simplify the explanation. The upward direction in FIG. 8 is the substrate transportation direction.

First, the black matrix 61 is formed on the substrate 20 by use of a commonly-known technique. Subsequently, a red photoresist is applied to the substrate 20, and then the small mask continuous exposure is performed while the substrate 20 is being transported in the Y direction shown in (a), to form the red colored layers 62 in the display region 40 and to form the first layers 81 in the first non-display regions 51.

Next, a green photoresist is applied to the substrate 20, and then the small mask continuous exposure is performed while the substrate 20 is being transported in the X direction shown in (b), to form green colored pixels and the layers 91 in the display region 40 and to form the second layers 82 in the second non-display regions 52.

Next, a blue photoresist is applied to the substrate 20, and as shown in (c), the proximity exposure of the substrate 20 is performed once to simultaneously form the third layers 83 on the first layers 81 in the first non-display regions 51, the fourth layers 84 on the second layers 82 in the second non-display regions 52, and the layers 92 on the layers 91 in the display region 40. At the same time, blue colored pixels are also formed in the display region 40.

Finally, the ITO film 63 is formed so as to cover all of the display region 40, the first non-display regions 51, and the second non-display regions 52.

As described above, by performing the small mask continuous exposure on the substrate 20 in the two directions orthogonal to each other and further performing the proximity exposure on the substrate 20 once, the dummy PSs 71 and 72 each consisting of two layers composed of the same material as the colored pixels can be formed in the first non-display regions 51 and the second non-display regions 52, respectively, such that the dummy PSs 71 and 72 are arranged with desired pitches and have desired shapes. In addition, since the proximity exposure mode using a photomask that allows for exposure covering the entire non-display regions at one time is employed in part of the exposure process, the total number of times of exposure can be reduced, which gives an effect that the exposure steps can be performed without increase in process takt time.

Second Embodiment

Figure 9:
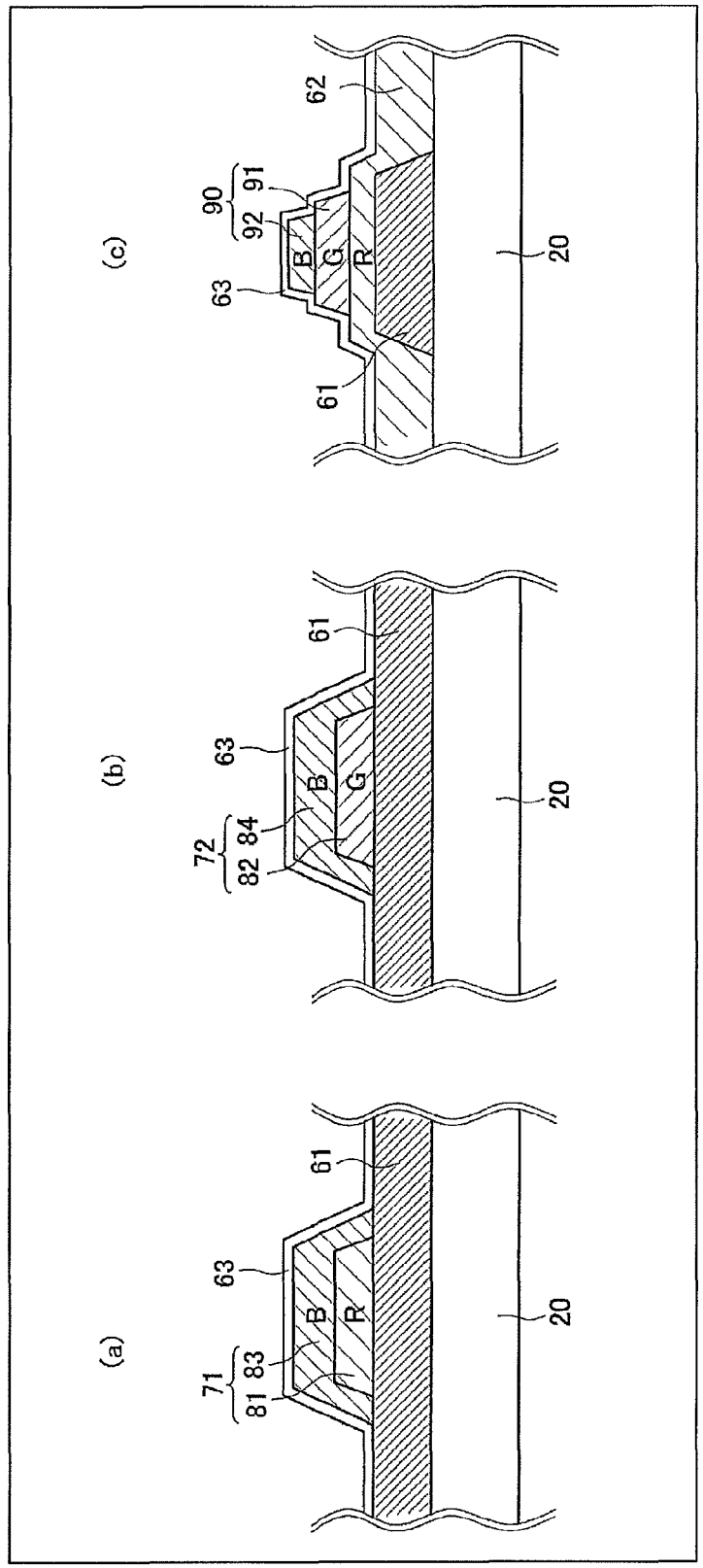
FIG. 9 shows cross-sectional views of a PS and dummy PSs on a color filter substrate according to a second embodiment.

FIG. 9 shows cross-sectional views of a PS and dummy PSs on a color filter substrate according to a second embodiment. More particularly, (a) corresponds to a cross-sectional view taken along the I-I line of FIG. 6, (b) corresponds to a cross-sectional view taken along the II-II line of FIG. 6, and (c) corresponds to a cross-sectional view taken along the line of FIG. 6.

As shown in FIG. 9(a), the first layer 81 and the third layer 83 constituting the dummy PS 71 are formed in the first non-display region 51 on the substrate 20 on the surface of which the black matrix 61 is formed. As shown in (b), the second layer 82 and the fourth layer 84 constituting the dummy PS 72 are formed in the second non-display region 52 on the substrate 20 on the surface of which the black matrix 61 is formed. As shown in (c), the black matrix 61 and the colored layer 62 are stacked in the display region 40 on the substrate 20. In addition, the layers 91 and 92 constituting the PS 90 are stacked on the colored layer 62 over the black matrix 61. Furthermore, the ITO film 63 is formed so as to cover all of the display region 40, the first non-display region 51, and the second non-display region 52 which are shown in (a) to (c). In the present embodiment, the first layer 81 is composed of the same material as the red colored layer 62, the second layer 82 and the layer 91 are composed of the same material as a green colored layer, and the third layer 83, the fourth layer 84, and the layer 92 are composed of the same material as a blue colored layer.

Figure 10:
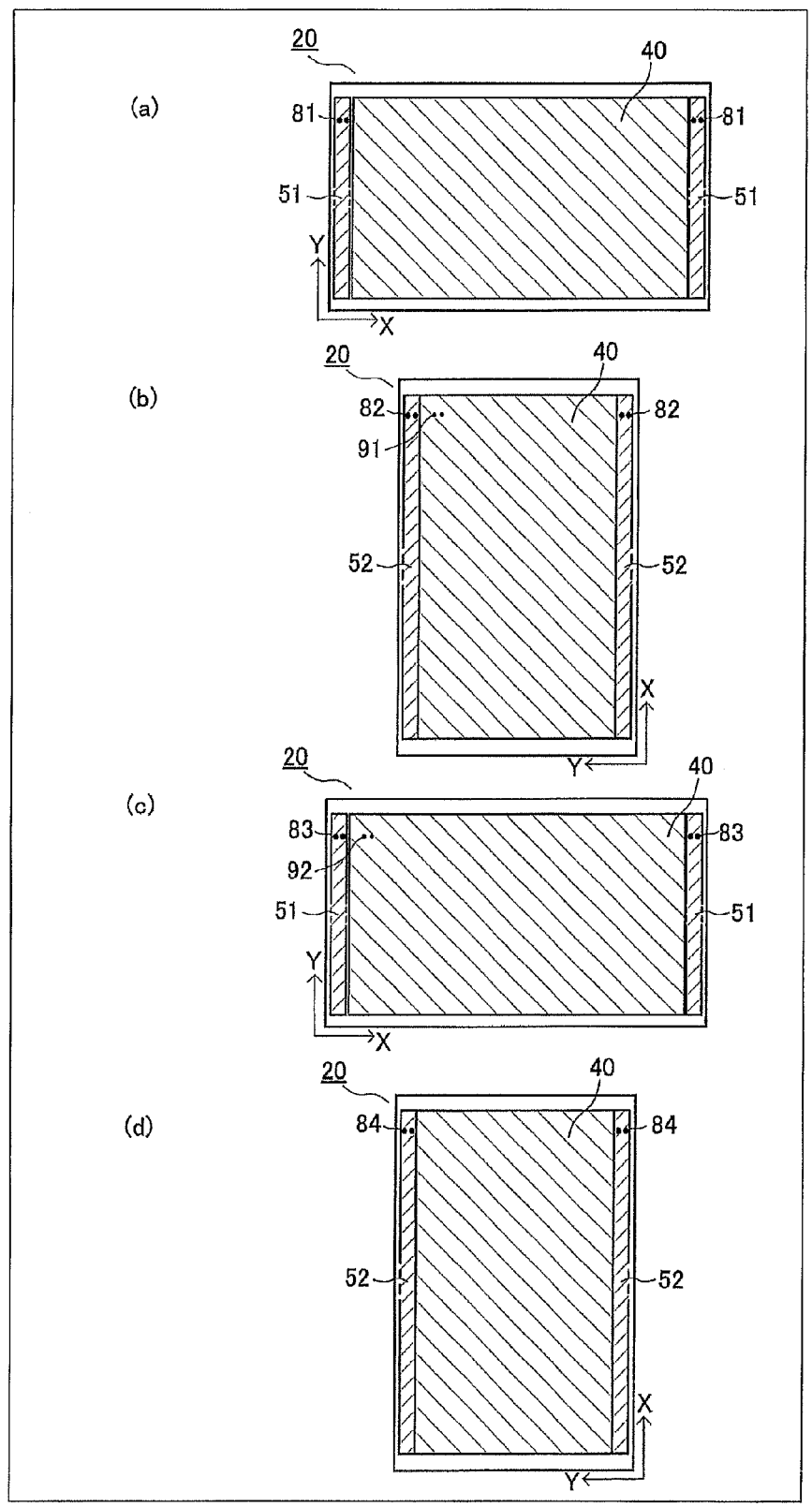
FIG. 10 shows plan views illustrating an exposure method for the color filter substrate according to the second embodiment.

FIG. 10 shows plan views illustrating an exposure method for the color filter substrate according to the second embodiment. Also in FIG. 10, the upward direction is the substrate transportation direction.

First, the black matrix 61 is formed on the substrate 20 by use of a commonly-known technique. Subsequently, a red photoresist is applied to the substrate 20, and then the small mask continuous exposure is performed while the substrate 20 is being transported in the Y direction shown in (a), to form the red colored layers 62 in the display region 40 and to form the first layers 81 in the first non-display regions 51.

Next, a green photoresist is applied to the substrate 20, and then the small mask continuous exposure is performed while the substrate 20 is being transported in the X direction shown in (b), to form green colored pixels and the layers 91 in the display region 40 and to form the second layers 82 in the second non-display regions 52.

Next, a blue photoresist is applied to the substrate 20, and then the small mask continuous exposure is performed while the substrate 20 is being transported in the Y direction shown in (c), to form blue colored layers and the layers 92 on the layers 91 in the display region 40, and to form the third layers 83 on the first layers 81 in the first non-display regions 51.

Subsequently, the substrate 20 is rotated by 90 degrees, and the small mask continuous exposure is performed while the substrate 20 is being transported in the X direction shown in (d), to form the fourth layers 84 on the second layers 82 in the second non-display regions 52.

Finally, the ITO film 63 is formed so as to cover all of the display region 40, the first non-display regions 51, and the second non-display regions 52.

As described above, also by performing the small mask continuous exposure on the substrate 20 two times in each of the two directions orthogonal to each other, the dummy PSs 71 can be formed in the first non-display regions 51, and the dummy PSs 72 can be formed in the second non-display regions 52, such that the dummy PSs 71 and 72 are arranged with desired pitches and have desired shapes. The blue photoresist is exposed two separate times in the X direction and the Y direction. Accordingly, the blue colored pixels and the layers 92 may be formed in one exposure step or in two separate exposure steps.

Third Embodiment

Figure 11:
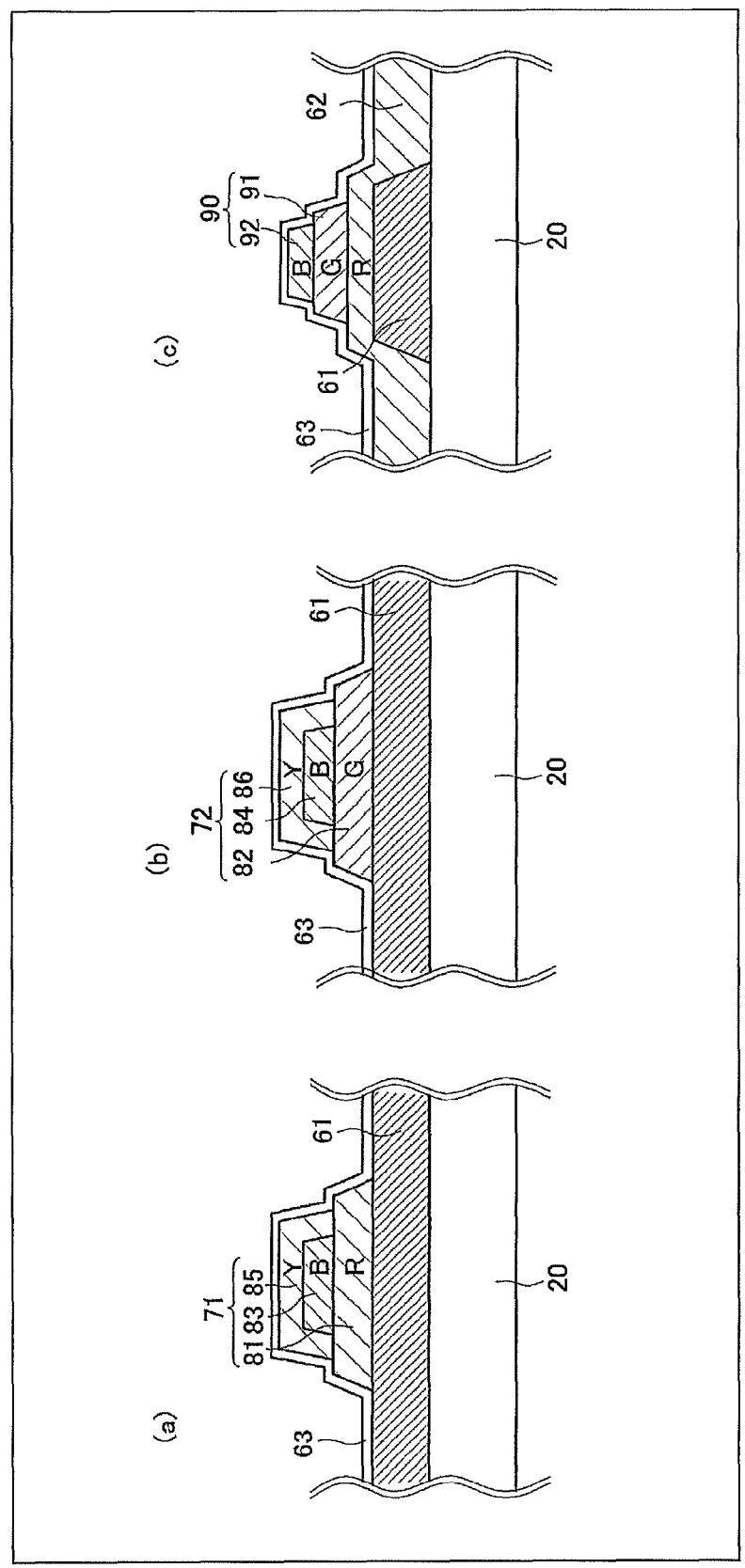
FIG. 11 shows cross-sectional views of a PS and dummy PSs on a color filter substrate according to a third embodiment.

FIG. 11 shows cross-sectional views of a PS and dummy PSs on a color filter substrate according to a third embodiment. More particularly, (a) corresponds to a cross-sectional view taken along the I-I line of FIG. 6, (b) corresponds to a cross-sectional view taken along the II-II line of FIG. 6, and (c) corresponds to a cross-sectional view taken along the line of FIG. 6.

The color filter substrate according to the present embodiment is different from the first embodiment in that yellow colored layers are provided in addition to red, green, and blue colored layers. As shown in FIG. 11(a), the first layer 81, the third layer 83, and a fifth layer 85 constituting the dummy PS 71 are formed in the first non-display region 51 on the substrate 20 on the surface of which the black matrix 61 is formed. As shown in (b), the second layer 82, the fourth layer 84, and a sixth layer 86 constituting the dummy PS 72 are formed in the second non-display region 52 on the substrate 20 on the surface of which the black matrix 61 is formed. As shown in (c), the black matrix 61 and the colored layer 62 are stacked in the display region 40 on the substrate 20. In addition, the layers 91 and 92 constituting the PS 90 are formed on the colored layer 62 over the black matrix 61. Furthermore, the ITO film 63 is formed so as to cover all of the display region 40, the first non-display region 51, and the second non-display region 52 which are shown in (a) to (c). In the present embodiment, the first layer 81 is composed of the same material as the red colored layer 62, the second layer 82 and the layer 91 are composed of the same material as a green colored layer, the third layer 83, the fourth layer 84, and the layer 92 are composed of the same material as a blue colored layer, and the fifth layer 85 and the sixth layer 86 are composed of the same material as an yellow colored layer.

Figure 12:
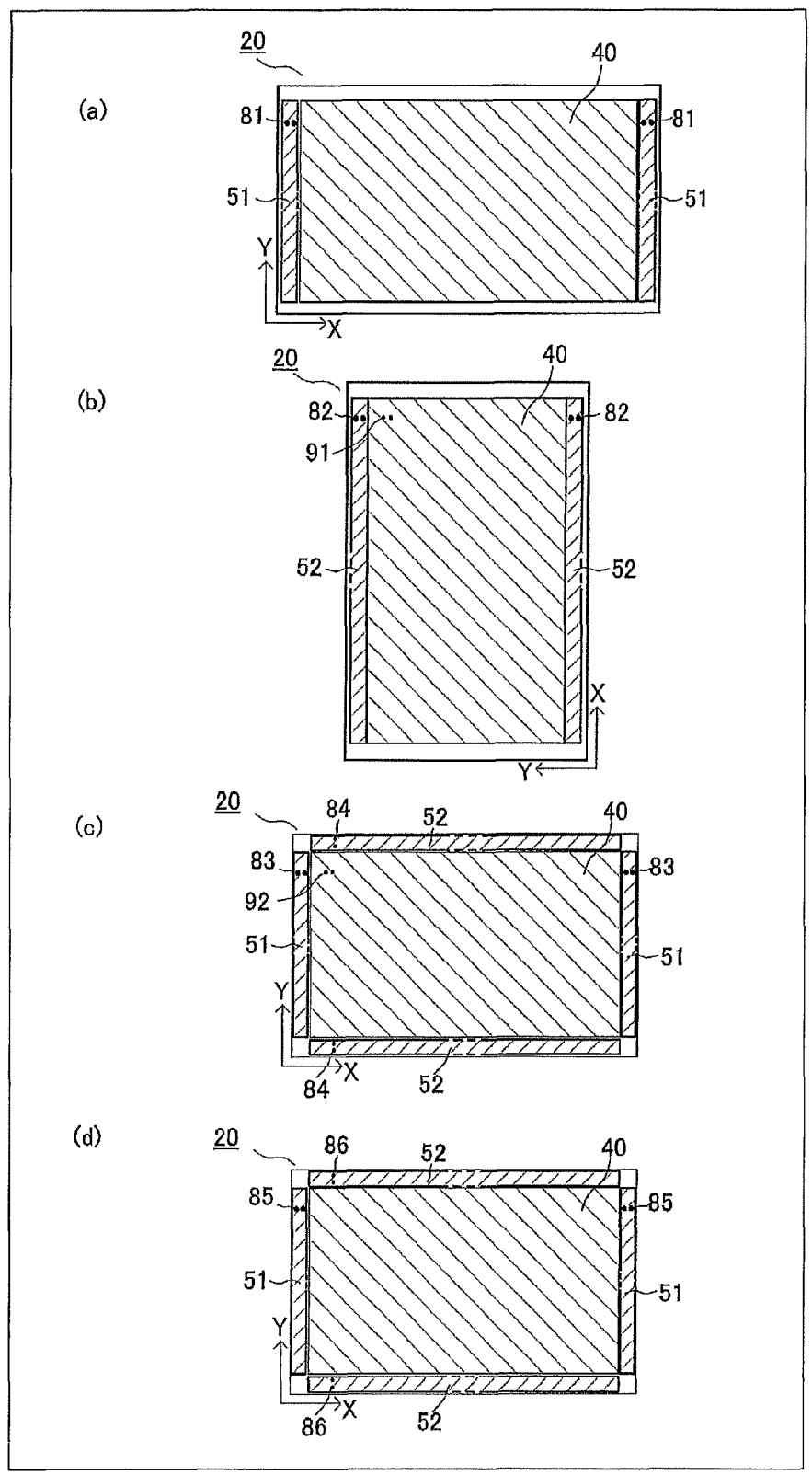
FIG. 12 shows plan views illustrating an exposure method for the color filter substrate according to the third embodiment.

FIG. 12 shows plan views illustrating an exposure method for the color filter substrate according to the third embodiment. Also in FIG. 12, the upward direction is the substrate transportation direction.

In FIG. 12(a) to (c), first, the same exposure methods as described in FIG. 8(a) to (c) are performed to form red, green, and blue colored pixels, and the layers 91 and 92 in the display region 40, form the first layers 81 and the third layers 83 in the first non-display regions 51, and form the second layers 82 and the fourth layers 84 in the second non-display regions 52.

Subsequently, an yellow photoresist is applied to the substrate 20, and as shown in (d), the proximity exposure of the substrate 20 is performed once to simultaneously form the fifth layers on the third layers 83 in the first non-display regions 51, the six layers 86 on the fourth layers 84 in the second non-display regions 52, and yellow colored pixels in the display region 40.

Finally, the ITO film 63 is formed so as to cover all of the display region 40, the first non-display regions 51, and the second non-display regions 52.

As described above, by further performing the proximity exposure in addition to the steps of the first embodiment, the dummy PSs each consisting of three layers composed of the same material as the colored pixels can be formed both in the first non-display regions 51 and the second non-display regions 52 with a smaller number of times of exposure than that in the case where the small mask continuous exposure mode is employed in the entire exposure process. Furthermore, an effect that the exposure process can be performed without increase in process takt time is provided.

Fourth Embodiment

Figure 13:
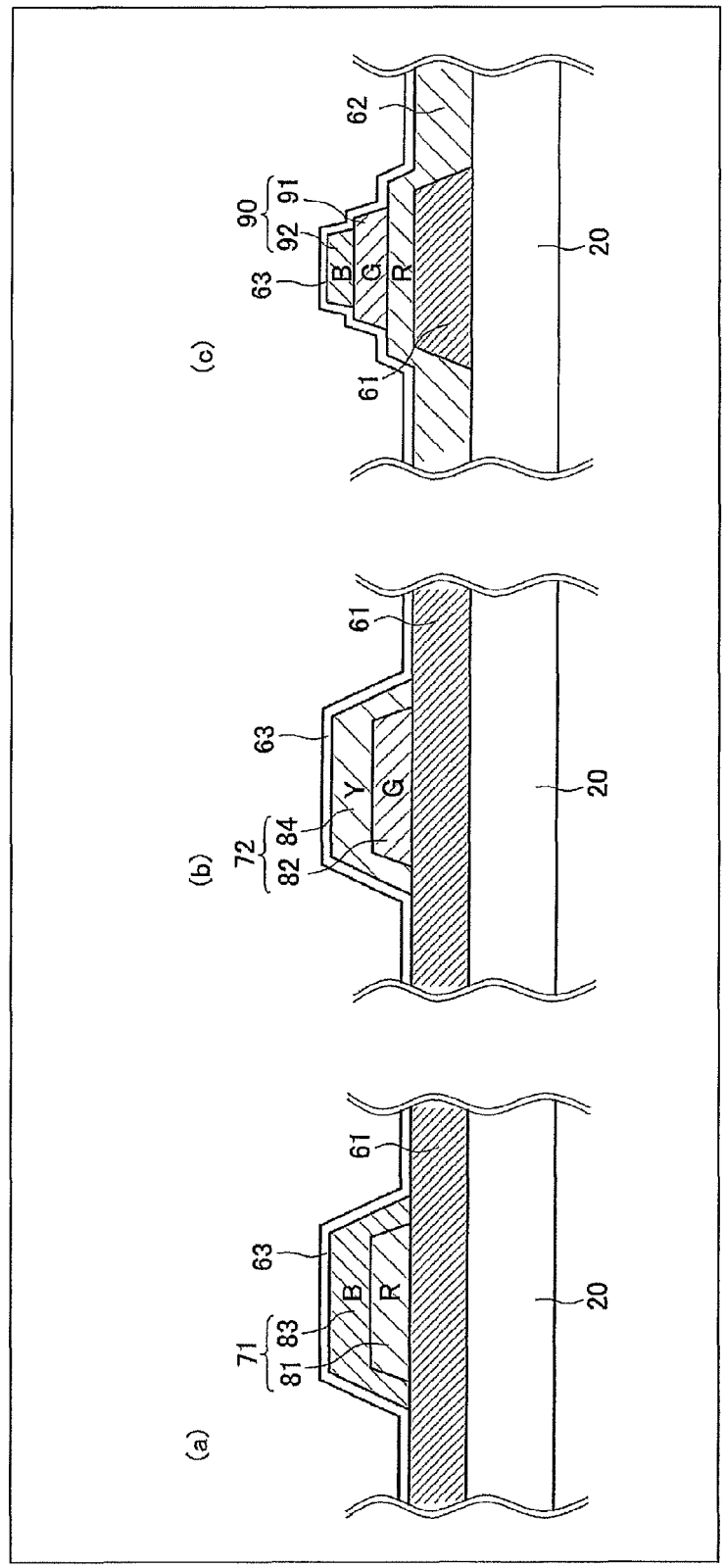
FIG. 13 shows cross-sectional views of a PS and dummy PSs on a color filter substrate according to a fourth embodiment.

FIG. 13 shows cross-sectional views of a PS and dummy PSs on a color filter substrate according to a fourth embodiment. More particularly, (a) corresponds to a cross-sectional view taken along the I-I line of FIG. 6, (b) corresponds to a cross-sectional view taken along the II-II line of FIG. 6, and (c) corresponds to a cross-sectional view taken along the line of FIG. 6.

As shown in FIG. 13(a), the first layer 81 and the third layer 83 constituting the dummy PS 71 are formed in the first non-display region 51 on the substrate 20 on the surface of which the black matrix 61 is formed. As shown in (b), the second layer 82 and the fourth layer 84 constituting the dummy PS 72 are formed in the second non-display region 52 on the substrate 20 on the surface of which the black matrix 61 is formed. As shown in (c), the black matrix 61 and the colored layer 62 are stacked in the display region 40 on the substrate 20. The layers 91 and 92 constituting the PS 90 are formed on the colored layer 62 over the black matrix 61. Furthermore, the ITO film 63 is formed so as to cover all of the display region 40, the first non-display region 51, and the second non-display region 52 which are shown in (a) to (c). In the present embodiment, the first layer 81 is composed of the same material as the red colored layer 62, the second layer 82 and the layer 91 are composed of the same material as a green colored layer, the third layer 83 and the layer 92 are composed of the same material as a blue colored layer, and the fourth layer 84 is composed of the same material as an yellow colored layer.

Figure 14:
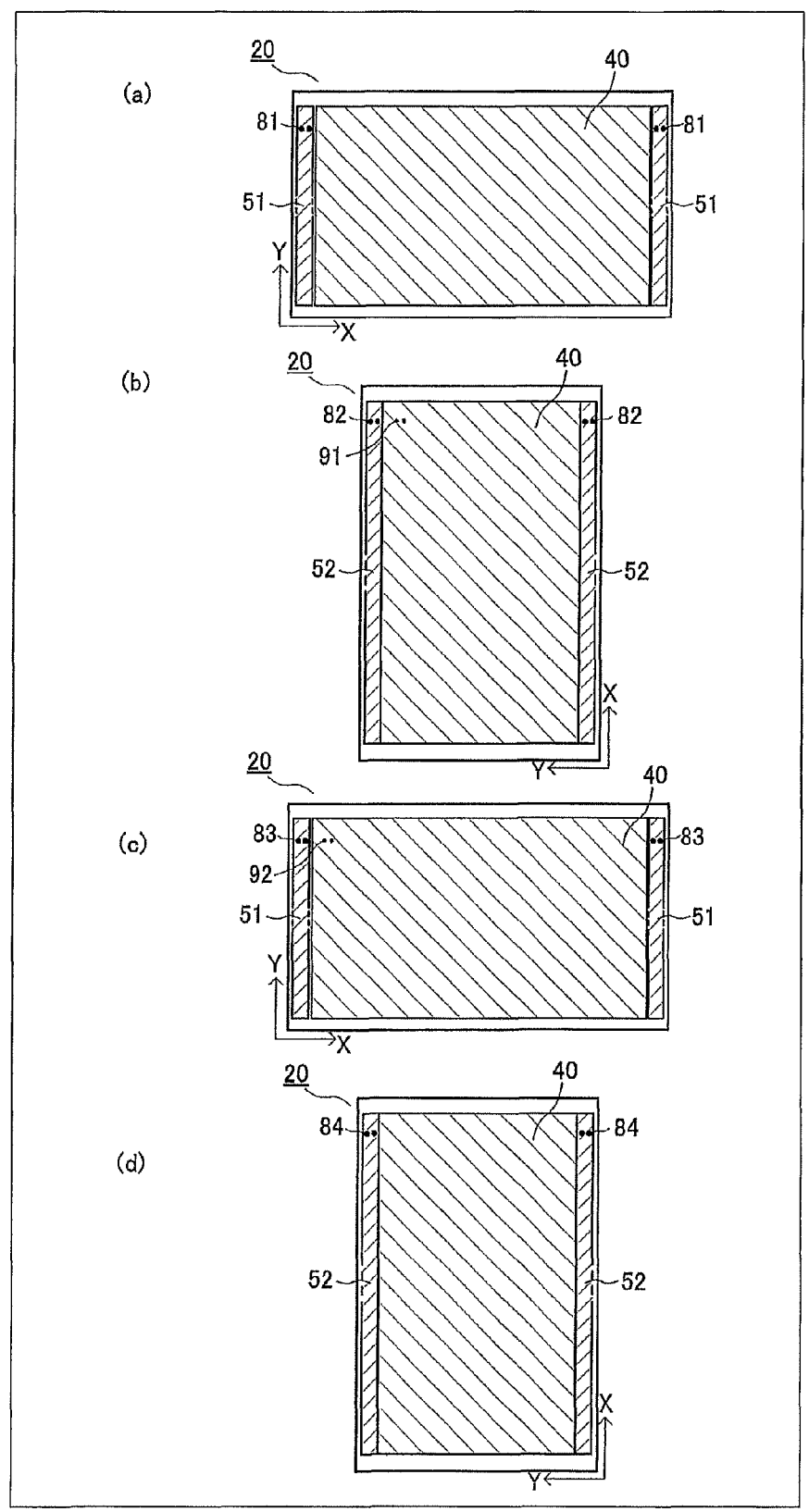
FIG. 14 shows plan views illustrating an exposure method for the color filter substrate according to the fourth embodiment.
Figure 15:
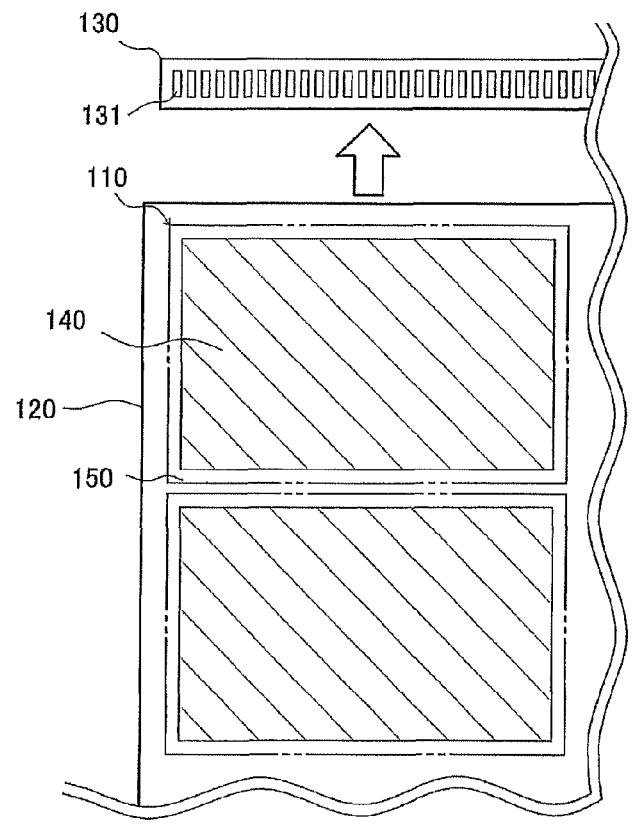
FIG. 15 is a plan view illustrating an exposure method using a small mask continuous exposure mode.
Figure 16:
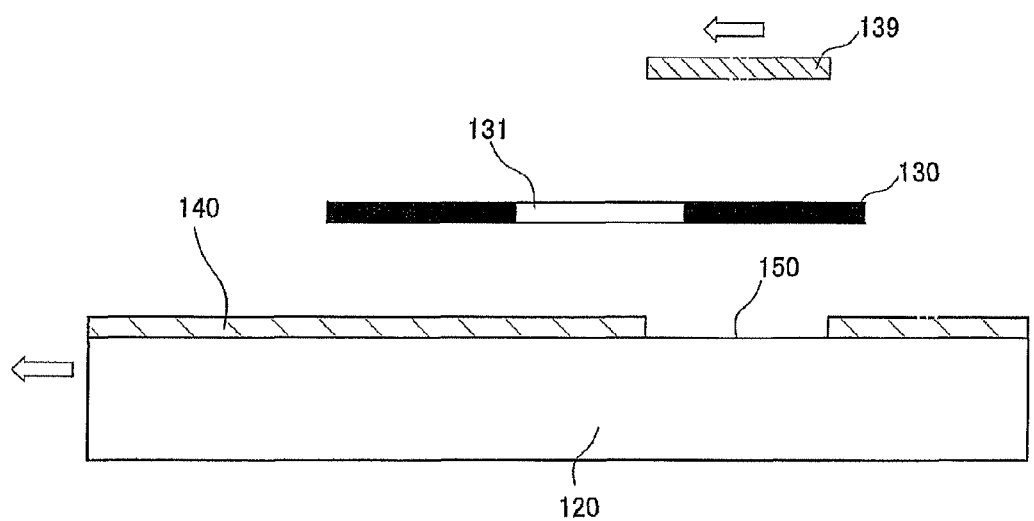
FIG. 16 is a side view illustrating a positional relationship among a substrate, a photomask, and a blind shutter.

FIG. 14 shows plan views illustrating an exposure method for the color filter substrate according to the fourth embodiment. Also in FIG. 14, the upward direction is the substrate transportation direction.

First, the black matrix 61 is formed on the substrate 20 by use of a commonly-known technique. Subsequently, a red photoresist is applied to the substrate 20, and then the small mask continuous exposure is performed while the substrate 20 is being transported in the Y direction shown in (a), to form the red colored layers 62 and the first layers 81 in the display region 40 and the first non-display regions 51, respectively, on the substrate 20.

Next, a green photoresist is applied to the substrate 20, and then the small mask continuous exposure is performed while the substrate 20 is being transported in the X direction shown in (b), to form green colored layers and the layers 91 in the display region 40 and to form the second layers 82 in the second non-display regions 52.

Next, a blue photoresist is applied to the substrate 20, and then the small mask continuous exposure is performed while the substrate 20 is being transported in the Y direction shown in (c), to simultaneously form blue colored pixels and the layers 92 on the layers 91 in the display region 40, and the third layers 83 on the first layers 81 in the first non-display regions 51.

Subsequently, an yellow photoresist is applied to the substrate 20, and then the small mask continuous exposure is performed while the substrate 20 is being transported in the X direction shown in (d), to form yellow colored pixels in the display region 40 and to form the fourth layers 84 on the second layers 82 in the second non-display regions 52.

Finally, the ITO film 63 is formed so as to cover all of the display region 40, the first non-display regions 51, and the second non-display regions 52.

As described above, by performing the small mask continuous exposure on the substrate 20 two times in each of the two directions orthogonal to each other, the dummy PSs 71 can be formed in the first non-display regions 51, and the dummy PSs 72 can be formed in the second non-display regions 52, such that the dummy PSs 71 and 72 are arranged with desired pitches and have desired shapes.

In the first embodiment, the order of exposure of the substrate is particularly specified as follows: scanning exposure in the Y direction; scanning exposure in the X direction; and proximity exposure. In the second and fourth embodiments, the order of exposure of the substrate is particularly specified as follows: scanning exposure in the Y direction; scanning exposure in the X direction; scanning exposure in the Y direction; and scanning exposure in the X direction. In the third embodiment, the order of exposure of the substrate is particularly specified as follows: scanning exposure in the Y direction; scanning exposure in the X direction; proximity exposure; and proximity exposure. However, the order of exposure is not limited to these orders. In the first embodiment, the steps of (a), (b), and (c) in FIG. 8 may be performed in any of six orders obtained by permutation of (a) to (c). In the second embodiment, the steps in FIG. 10 may be performed in any of the following orders: (a), (c), (d), and (b); (b), (a), (c), and (d); (b), (c), (d), and (a); (c), (d), (a), and (b); and (c), (d), (b), and (a) (furthermore, (c) and (d) may be reversed in each of these orders). In addition, in the third and fourth embodiments, the steps of (a), (b), (c), and (d) in FIGS. 12 and 14 may be performed in any of 24 orders obtained by permutation of (a) to (d).

In addition, in the first to fourth embodiments, colored pixels and PSs are formed in display regions while at the same time dummy PSs are formed in non-display regions. However, the present invention is not limited thereto, and the colored pixels and PSs may be formed in another step.

Furthermore, in the first to fourth embodiments, the colors of colored layers and the order of formation of the colored layers are particularly specified. However, the colors and the order of formation are not limited to examples described in the embodiments, and can optionally be specified.

INDUSTRIAL APPLICABILITY

The present invention is applicable to, for example, an exposure method for color filter substrates used for liquid crystal display devices or organic EL.

DESCRIPTION OF THE REFERENCE CHARACTERS 10 color filter substrate
20 substrate
30, 35 photomask
31, 32, 36 array of openings
40 display region
51 first non-display region
52 second non-display region
53, 54 peripheral dummy PS formation region
61 black matrix
62 colored layer
63 ITO film
71, 72 dummy PS
81 first layer
82 second layer
83 third layer
84 fourth layer
85 fifth layer
86 sixth layer
90 PS
91, 92 layer

The invention claimed is:

1. An exposure method for a color filter substrate having: a rectangular display region which has a pair of sides extending in a first direction and a pair of sides extending in a second direction orthogonal to the first direction and in which a plurality of colored pixels and a plurality of photo spacers (PSs) are provided; a pair of first non-display regions which are respectively along the sides extending in the first direction and in which a plurality of dummy photo spacers (dummy PSs) are provided; and a pair of second non-display regions which are respectively along the sides extending in the second direction and in which a plurality of dummy photo spacers (dummy PSs) are provided, the exposure method comprising:

forming, in the first non-display region, a first layer composed of the same material as a colored pixel of a first color and included in a first dummy PS, by intermittently performing exposure a plurality of times on a substrate to which a photoresist of the first color has been applied while transporting the substrate in the first direction;

forming, in the second non-display region, a second layer composed of the same material as a colored pixel of a second color and included in a second dummy PS, by intermittently performing exposure a plurality of times on the substrate to which a photoresist of the second color has been applied while transporting the substrate in the first direction;

forming a third layer stacked together with the first layer in the first non-display region, composed of the same material as a colored pixel of a third color, and included in the first dummy PS, and forming a fourth layer stacked together with the second layer in the second non-display region, composed of the same material as the colored pixel of the third color, and included in the second dummy PS, by performing exposure once on the substrate to which a photoresist of the third color has been applied; and forming a fifth layer stacked together with the first layer and the third layer in the first non-display region, composed of the same material as a colored pixel of a fourth color, and included in the first dummy PS, and forming a sixth layer stacked together with the second layer and the fourth layer in the second non-display region, composed of the same material as the colored pixel of the fourth color, and included in the second dummy PS, by performing exposure once on the substrate to which a photoresist of the fourth color has been applied, wherein the forming the first layer, the forming the second layer, the forming the third layer and the fourth layer, and the forming the fifth layer and the sixth layer are carried out in an arbitrary order.

2. The exposure method for the color filter substrate according to claim 1, wherein the color filter substrate has, in the display region, the colored pixels of the first to fourth colors different from each other, the first layer is formed simultaneously with the colored pixel of the first color in the display region, the second layer is formed simultaneously with the colored pixel of the second color and a layer of the second color included in a photo spacer (PS) in the display region, the third and fourth layers are formed simultaneously with the colored pixel of the third color and a layer of the third color included in the PS in the display region, and the fifth and sixth layers are formed simultaneously with the colored pixel of the fourth color and a layer of the fourth color included in the PS in the display region.

3. An exposure method for a color filter substrate having: a rectangular display region which has a pair of sides extending in a first direction and a pair of sides extending in a second direction orthogonal to the first direction and in which a plurality of colored pixels and a plurality of photo spacers (PSs) are provided; a pair of first non-display regions which are respectively along the sides extending in the first direction and in which a plurality of dummy photo spacers (dummy PSs) are provided; and a pair of second non-display regions which are respectively along the sides extending in the second direction and in which a plurality of dummy photo spacers (dummy PSs) are provided, the exposure method comprising:

forming, in the first non-display region, a first layer composed of the same material as a colored pixel of a first color and included in a first dummy PS, by intermittently performing exposure a plurality of times on a substrate to which a photoresist of the first color has been applied while transporting the substrate in the first direction;

forming, in the second non-display region, a second layer composed of the same material as a colored pixel of a second color and included in a second dummy PS, by intermittently performing exposure a plurality of times on the substrate to which a photoresist of the second color has been applied while transporting the substrate in the first direction;

forming a third layer stacked together with the first layer in the first non-display region, composed of the same material as a colored pixel of a third color, and included in the first dummy PS, by intermittently performing exposure a plurality of times on the substrate to which a photoresist of the third color has been applied while transporting the substrate in the first direction; and forming a fourth layer stacked together with the second layer in the second non-display region, composed of the same material as a colored pixel of a fourth color, and included in the second dummy PS, by intermittently performing exposure a plurality of times on the substrate to which a photoresist of the fourth color has been applied while transporting the substrate in the second direction, wherein the forming the first layer, the forming the second layer, the forming the third layer, and the forming the fourth layer are carried out in an arbitrary order.

4. The exposure method for the color filter substrate according to claim 3, wherein the color filter substrate has, in the display region, the colored pixels of the first to fourth colors different from each other, the first layer is formed simultaneously with the colored pixel of the first color in the display region, the second layer is formed simultaneously with the colored pixel of the second color and a layer of the second color included in a photo spacer (PS) in the display region, the third layer is formed simultaneously with the colored pixel of the third color and a layer of the third color included in the PS in the display region, and the fourth layer is formed simultaneously with the colored pixel of the fourth color and a layer of the fourth color included in the PS in the display region.

5. A color filter substrate having: a rectangular display region which has a pair of sides extending in a first direction and a pair of sides extending in a second direction orthogonal to the first direction; a pair of first non-display regions which are respectively along the sides extending in the first direction; and a pair of second non-display regions which are respectively along the sides extending in the second direction, the color filter substrate comprising:

colored pixels of first to fourth colors formed in the display region;

a photo spacer formed in the display region;

a first dummy photo spacer (dummy PS) including a first layer provided in the first non-display region and composed of the same material as the colored pixel of the first color, a third layer stacked on the first layer and composed of the same material as the colored pixel of the third color, and a fifth layer stacked on the third layer and composed of the same material as the colored pixel of the fourth color; and a second dummy PS including a second layer provided in the second non-display region and composed of the same material as the colored pixel of the second color, a fourth layer stacked on the second layer and composed of the same material as the colored pixel of the third color, and a sixth layer stacked on the fourth layer and composed of the same material as the colored pixel of the fourth color.

6. A color filter substrate having: a rectangular display region which has a pair of sides extending in a first direction and a pair of sides extending in a second direction orthogonal to the first direction; a pair of first non-display regions which are respectively along the sides extending in the first direction; and a pair of second non-display regions which are respectively along the sides extending in the second direction, the color filter substrate comprising:

colored pixels of first to fourth colors formed in the display region;

a photo spacer formed in the display region;

a first dummy photo spacer (dummy PS) including a first layer provided in the first non-display region and composed of the same material as the colored pixel of the first color, and a third layer stacked on the first layer and composed of the same material as the colored pixel of the third color; and a second dummy PS including a second layer provided in the second non-display region and composed of the same material as the colored pixel of the second color, and a fourth layer stacked on the second layer and composed of the same material as the colored pixel of the fourth color.

* * * * *